(12) United States Patent
Nakagawa et al.

(10) Patent No.: US 9,170,842 B2
(45) Date of Patent: Oct. 27, 2015

(54) INFORMATION PROCESSING TERMINAL AND RESOURCE RELEASE METHOD

(75) Inventors: Tomohiro Nakagawa, Chiyoda-ku (JP); Maki Ohata, Chiyoda-ku (JP); Kazuhisa Sekine, Chiyoda-ku (JP); Ken Ohta, Chiyoda-ku (JP); Masahiro Fukuyori, Kawasaki (JP); Tetsuya Shioda, Kawasaki (JP); Takahiro Ito, Kawasaki (JP); Katsuaki Akama, Kawasaki (JP)

(73) Assignees: NTT DOCOMO, INC., Tokyo (JP); FUJITSU LIMITED, Kawasaki-shi (JP)

( * ) Notice: Subject to any disclaimer, the term of this patent is extended or adjusted under 35 U.S.C. 154(b) by 345 days.

(21) Appl. No.: 13/814,137

(22) PCT Filed: Jul. 27, 2011

(86) PCT No.: PCT/JP2011/067153
§ 371 (c)(1),
(2), (4) Date: Apr. 18, 2013

(87) PCT Pub. No.: WO2012/017898
PCT Pub. Date: Feb. 9, 2012

(65) Prior Publication Data
US 2013/0205302 A1 Aug. 8, 2013

(30) Foreign Application Priority Data
Aug. 5, 2010 (JP) ................................. 2010-176503

(51) Int. Cl.
*G06F 9/46* (2006.01)
*G06F 9/50* (2006.01)

(52) U.S. Cl.
CPC ............ *G06F 9/5005* (2013.01); *G06F 9/5022* (2013.01)

(58) Field of Classification Search
None
See application file for complete search history.

(56) References Cited

U.S. PATENT DOCUMENTS

| 6,078,942 | A | 6/2000 | Eisler et al. | |
| 7,503,049 | B2 * | 3/2009 | Kanemura et al. | 718/108 |
| 2002/0013802 | A1 | 1/2002 | Mori et al. | |
| 2003/0018682 | A1 * | 1/2003 | Katayama | 709/102 |
| 2005/0235289 | A1 * | 10/2005 | Barillari et al. | 718/100 |
| 2007/0106992 | A1 * | 5/2007 | Kitamura | 718/104 |

FOREIGN PATENT DOCUMENTS

JP        2009 525513        7/2009

OTHER PUBLICATIONS

Extended European Search Report issued Jun. 6, 2014 in Patent Application No. 11814525.9.
International Preliminary Report on Patentability and Written Opinion issued Mar. 21, 2013 in Application No. PCT/JP2011/067153.

\* cited by examiner

*Primary Examiner* — Emerson Puente
*Assistant Examiner* — Zhi Chen
(74) *Attorney, Agent, or Firm* — Oblon, McClelland, Maier & Neustadt, L.L.P.

(57) ABSTRACT

In an information processing terminal, a second screen activation monitoring unit that has received a focus OFF notification sends a domain switch request notification to a domain control unit, and the domain control unit that has received the notification sends a domain switch notification to a first OS. Then, the first OS sends a focus ON notification to a first screen activation monitoring unit and further sends the focus OFF notification to a first application. A resource is thereby released by the first application that is implemented to release an acquired resource upon receiving the focus OFF notification.

6 Claims, 5 Drawing Sheets

INFORMATION PROCESSING TERMINAL AND RESOURCE RELEASE METHOD

TECHNICAL FIELD

The present invention relates to a resource release method in an information processing terminal that runs a plurality of operating systems (which are referred to hereinafter as "OS"), for releasing a resource acquired by an application running on the OS before switching at the time of application starting or switching that accompanies OS switching.

BACKGROUND ART

The virtualization technology that runs a plurality of OS on an information processing terminal such as a mobile phone terminal, PDA (Personal Digital Assistant), personal computer or server device has been developed. In the virtualization technology, it is necessary to control the system so as to allow simple operation before and after switching even when operating with a plurality of OS switched from one to another. For example, Patent Literature 1 discloses a technique that aims at providing a consistent feeling of operation in different environments (applications, resources and files).

CITATION LIST

Patent Literature

PTL 1: Japanese Unexamined Patent Application Publication No. 2009-525513

SUMMARY OF INVENTION

Technical Problem

However, according to the related art, in the case where the switching of an application that operates on a plurality of OS occurs, if the switching is made before a resource acquired by an application before the switching is released appropriately, an application after the switching cannot acquire a resource appropriately, which can cause a trouble in the operation and execution of the application.

The present invention has been accomplished to solve the above problems and an object of the present invention is thus to provide an information processing terminal and a resource release method that allow appropriate release of a resource acquired by an application before switching at the time of application switching that accompanies OS switching in the information processing terminal to run a plurality of OS.

Solution to Problem

To solve the above problem, an information processing terminal according to one embodiment of the present invention is an information processing terminal configured to run a plurality of operating systems having a function of sending to a process a focus status notification indicating whether an output is in front and whether the process is active, which includes a domain control means for controlling which of the plurality of operating systems is an active operating system, a first screen activation monitoring means for running on a first operating system among the plurality of operating systems and monitoring a focus status notification from the first operating system, a second screen activation monitoring means for running on a second operating system among the plurality of operating systems and monitoring a focus status notification from the second operating system, and a resource management means for managing a resource used by each of the operating systems, wherein when receiving a focus OFF notification, being the focus status notification from the second operating system, indicating that an output is moved to back and no longer active, triggered that a second application running on the second operating system has come to front, the second screen activation monitoring means sends a domain switch request notification for requesting to set the second operating system as an active operating system to the domain control means, when receiving the domain switch request notification from the second screen activation monitoring means, the domain control means sends a domain switch notification notifying that the first operating system is to be set as an inactive operating system to the first operating system, when receiving the domain switch notification, the first operating system sends a focus ON notification, being the focus status notification, indicating that an output has come to front and become active to the first screen activation monitoring means and further sends the focus OFF notification to a first application running on the first operating system, and when receiving a resource release notification notifying release of a resource from the first application, triggered by receipt of the focus OFF notification, the resource management means makes control to release a resource acquired by the first application.

Further, to solve the above problem, a resource release method according to one embodiment of the present invention is a resource release method for causing an application to release a resource in an information processing terminal configured to run a plurality of operating systems having a function of sending to a process a focus status notification indicating whether an output is in front and whether the process is active, the information processing terminal including a domain control means for controlling which of the plurality of operating systems is an active operating system, a first screen activation monitoring means for running on a first operating system among the plurality of operating systems and monitoring a focus status notification from the first operating system, a second screen activation monitoring means for running on a second operating system among the plurality of operating systems and monitoring a focus status notification from the second operating system, and a resource management means for managing a resource used by each of the operating systems, the method including a domain switch request notification step of, when receiving a focus OFF notification, being the focus status notification from the second operating system, indicating that an output is moved to back and no longer active, triggered that a second application running on the second operating system has come to front, sending a domain switch request notification for requesting to set the second operating system as an active operating system to the domain control means by the second screen activation monitoring means, a domain switch notification step of, when receiving the domain switch request notification from the second screen activation monitoring means, sending a domain switch notification notifying that the first operating system is to be set as an inactive operating system to the first operating system by the domain control means, a focus status notification step of, when receiving the domain switch notification, sending a focus ON notification, being the focus status notification, indicating that an output has come to front and become active to the first screen activation monitoring means and further sending the focus OFF notification to a first application running on the first operating system by the first operating system, and a resource release step of, when receiving a resource release notification notifying release of a resource from the first application, triggered by receipt of the focus OFF notification, making control to release a resource acquired by the first application by the resource management means.

According to the information processing terminal and the resource release method, the second screen activation monitoring means that has received a focus OFF notification sends a domain switch request notification to the domain control means, and the domain control means that has received the notification sends a domain switch notification to the first operating system. Then, the first operating system sends a focus ON notification to the first screen activation monitoring means and further sends a focus OFF notification to the first application. If the first application is implemented to release an acquired resource when it receives the focus OFF notification, the first application carries out the release of a resource. Thus, with the first and second screen activation monitoring means running on each operating system, the release of a resource at the switching of an operating system can be implemented easily without providing a special mechanism for resource release. Note that a trigger of the switching to the second application on the second application system includes the case where an active application is switched to a resident application or an already started application caused by an asynchronous event such as an incoming call or an internal timer and further includes the switching of an application that occurs when the operating system to be used is switched by a user's manual operation. Note that the resources as referred to in the present invention include software resources and hardware resources.

Further, in the information processing terminal according to one embodiment of the present invention, the first screen activation monitoring means may be a process that is set so that an output from the first screen activation monitoring means is invisible on a display screen, and the second screen activation monitoring means may be a process that is set so that an output from the second screen activation monitoring means is invisible on the display screen.

In this configuration, because the first and second screen activation monitoring means are set to be invisible on the display screen, a mechanism for resource release is implemented without interfering with the output to the display screen from another application. Further, because the first and second screen activation monitoring means are configured as a process similar to an application running on each operating system, a mechanism for resource release is achieved easily.

Further, the information processing terminal according to one embodiment of the present invention may further include a resource status inquiry means, and when receiving the focus ON notification, the first screen activation monitoring means may send a resource status check request notification for requesting an inquiry about a resource release status to the resource status inquiry means, when receiving the resource status check request notification, the resource status inquiry means may make an inquiry about a resource release status to the resource management means and, when a resource is not yet released, cause the first application to suspend or terminate, and, when receiving the resource release notification from the first application, triggered that the first application has suspended or terminated, the resource management means may make control to release a resource acquired by the first application.

The resource release method according to one embodiment of the present invention may be the resource release method in the information processing terminal further including a resource status inquiry means, the method further including a resource status check request notification step of, when receiving the focus ON notification, sending a resource status check request notification for requesting an inquiry about a resource release status to the resource status inquiry means by the first screen activation monitoring means, and an application stop step of, when receiving the resource status check request notification, making an inquiry about a resource release status to the resource management means and, when a resource is not yet released, causing the first application to suspend or terminate by the resource status inquiry means, and, in the resource release step, when receiving the resource release notification from the first application, triggered that the first application has suspended or terminated, the resource management means may make control to release a resource acquired by the first application.

Even when the first application is not implemented to release an acquired resource when it receives the focus OFF notification, the first screen activation monitoring means that has received the focus ON notification makes an inquiry about a resource release status and, when a resource is not yet released, the first application is forced to suspend or terminate. This enables the release of a resource acquired by the first application.

Further, in the information processing terminal according to one embodiment of the present invention, when receiving a notification from the first application, triggered by completion of release of a resource acquired by the first application, the domain control means may send a domain switch ready notification notifying that switching of an active operating system from the first operating system to the second operating system is possible to the second screen activation monitoring means, and, when receiving the domain switch ready notification, the second screen activation monitoring means may send a resource release notification notifying completion of release of a resource to the second application.

Further, the resource release method according to one embodiment of the present invention may further include a domain switch ready notification step of, when receiving a notification from the first application, triggered by completion of release of a resource acquired by the first application, sending a domain switch ready notification notifying that switching of an active operating system from the first operating system to the second operating system is possible to the second screen activation monitoring means by the domain control means, and a resource release notification step of, when receiving the domain switch ready notification, sending a resource release notification notifying completion of release of a resource to the second application by the second screen activation monitoring means.

In this configuration, when a resource acquired by the first application is released and the switching of an operating system and the acquisition of a resource by the second application become possible, the second screen activation monitoring means notifies that to the second application. This eliminates the need for the second application to make regular inquiries to a functional unit that controls resources. Thus, this promotes the efficiency of the resource acquisition process.

Advantageous Effects of Invention

It is possible in an information processing terminal to run a plurality of OS to appropriately release a resource acquired by an application before switching at the time of application switching that accompanies OS switching.

DESCRIPTION OF EMBODIMENTS

Embodiments of an information processing terminal and a resource release method according to the present invention are described hereinafter with reference to the drawings. Note that, the same elements are denoted by the same reference numerals where possible, and repeated explanation thereof is omitted.

First Embodiment

Figure 1:
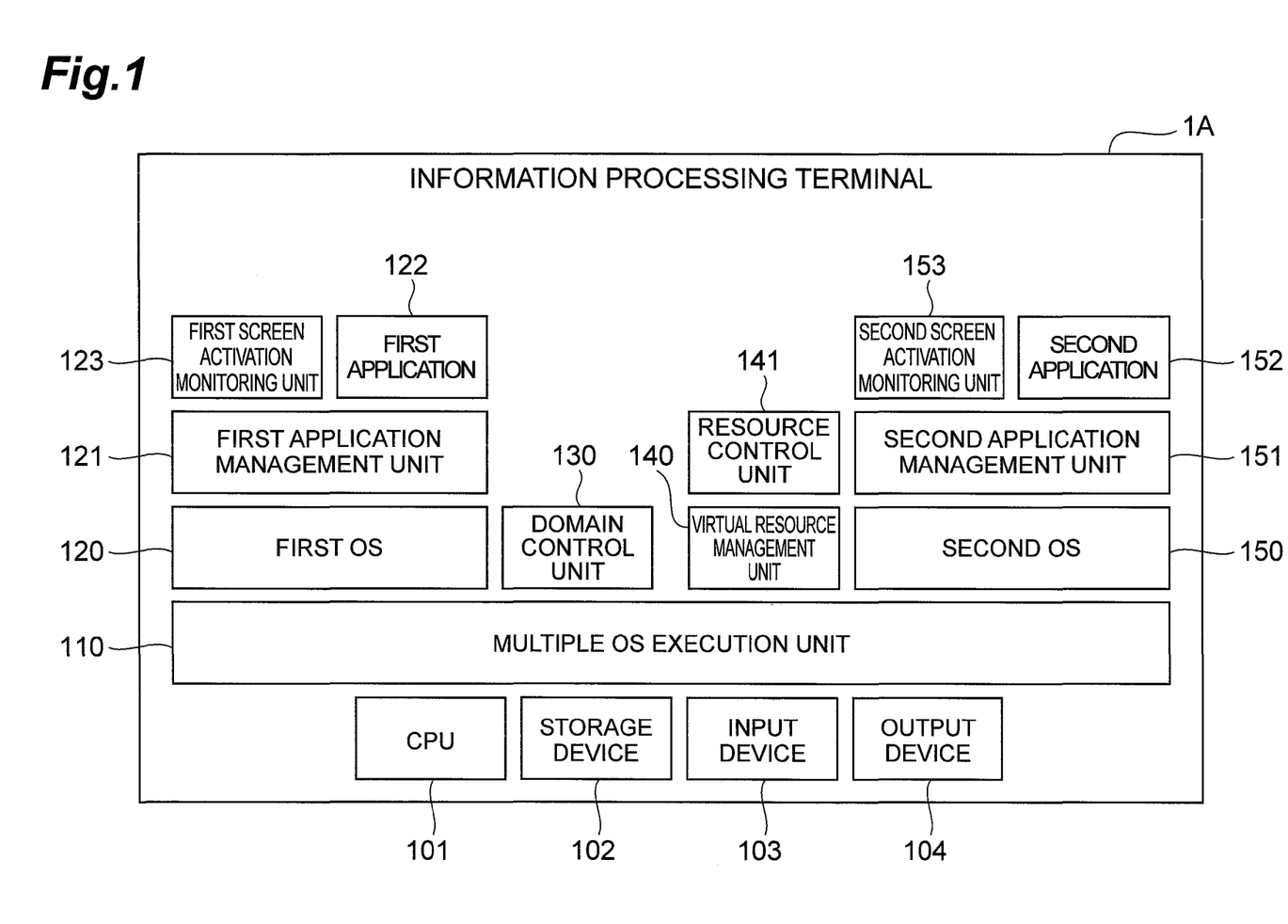
FIG. 1 is a schematic configuration diagram of an information processing terminal according to a first embodiment of the present invention.

FIG. 1 is a schematic configuration diagram of an information processing terminal 1A according to a first embodiment. As shown in FIG. 1, the information processing terminal 1A according to this embodiment is an information processing terminal such as a mobile phone terminal, PDA (Personal Digital Assistant), personal computer or server device, which is a terminal device configured so that a plurality of application programs (hereinafter referred to as "AP") can run on each of a plurality of operating systems (hereinafter referred to as "OS").

The information processing terminal 1A includes, as physical components, a CPU 101, a storage device 102, an input device 103 such as an input button, keyboard, mouse, microphone and digital camera, and an output device 104 such as a liquid crystal display and speaker, and further includes various functional components that operate using those hardware resources.

The information processing terminal 1A includes, as functional components, a multiple OS execution unit 110, and a first OS 120, a domain control unit 130 (domain control means), a virtual resource management unit 140 (resource management means) and a second OS 150 that run on the multiple OS execution unit 110.

The multiple OS execution unit 110 is virtualization software, and it manages resources such as the CPU 101, the storage device 102, the input device 103 and the output device 104 and implement appropriate assignment of resources to the first OS 120, the second OS 150, the domain control unit 130 and the virtual resource management unit 140 according needs. Note that the resources in this embodiment include software resources and hardware resources. Although two OS run on the multiple OS execution unit 110 in this case, three or more OS may run thereon. The first OS 120, the second OS 150, the domain control unit 130 and the virtual resource management unit 140 operate within virtual machines managed on the multiple OS execution unit 110.

The domain control unit 130 is a part that controls which of a plurality of OS running on the multiple OS execution unit 110 is active. The domain control unit 130 can store information about active OS and application as flag information, for example. To be more specific, when the domain control unit 130 receives a domain switch request notification for requesting to set the second OS 150 as an active operating system from a second screen activation monitoring unit 153 (which is described in detail later) running on the second OS 150, it notifies a domain switch notification notifying that the first OS 120 is to be set as an inactive operating system to the first OS 120.

Further, when the domain control unit 130 receives a notification from a first application 122 which is triggered by completion of release of a resource acquired by the first application 122, it notifies a domain switch ready notification notifying that the switching of an active operating system from the first OS 120 currently running the first application 122 to the second OS 150 to a screen activation monitoring unit running on the second OS 150.

The virtual resource management unit 140 is a part that manages resources (including hardware resources and software resources) used by each OS. The virtual resource management unit 140 causes a resource control unit 141 to make control such as hardware release based on an instruction or the like from an application, for example. The virtual resource management unit 140 can store the correspondence between each resource and an identifier of OS or application in a table, for example.

Note that the domain control unit 130 and the virtual resource management unit 140 may be implemented as a virtual machine with no involvement of OS control or may be implemented to run on OS.

Further, the information processing terminal 1A includes, as functional components, a first application management unit 121, a first application 122 and a first screen activation monitoring unit 123 (first screen activation monitoring means) that run on the first OS 120, a second application management unit 151, a second application 152 and a second screen activation monitoring unit 153 (second screen activation monitoring means) that run on the second OS 150, and a resource control unit 141 (resource management means) that runs on the virtual resource management unit 140. Each of the components is described in detail hereinbelow.

The first application management unit 121 is middleware that manages the execution status of the first application 122 and the first screen activation monitoring unit 123 and the control status of a window (output screen) that displays operation results on the output device 104.

The first application 122 is a process running on the OS. Note that the first application 122 may be a resident process or a transient process on the OS.

The first screen activation monitoring unit 123 is a part that monitors a focus status notification from the first OS 120. The focus status notification is a notification indicating whether the output from the process is in front on the output screen or not and whether the process is active or not.

To be more specific, when the first screen activation monitoring unit 123 receives a focus OFF notification from the first OS 120 which is triggered that the first application 122 has come to the front, it sends a domain switch request notification for requesting to set the first OS 120 as an active OS to the domain control unit 130. The focus OFF notification is one of the focus status notification, which indicates that the output of the process is moved to the back on the output screen and is no longer active.

Note that the first screen activation monitoring unit 123 is a process on the first OS 120, which is set so that the output from the first screen activation monitoring unit 123 is invisible on the output screen (display screen).

The resource control unit 141 is a part that makes resource release control in accordance with control by the virtual resource management unit 140. Further, the resource control unit 141 can control the first application 122 and the second application 152 to acquire specified resources.

The second application management unit 151 is middleware that manages the execution status of the second application 152 and the second screen activation monitoring unit 153 and the control status of a window (output screen) that displays operation results on the output device 104.

The second application 152 is a process running on the OS. Note that the second application 152 may be a resident process or a transient process on the OS.

The second screen activation monitoring unit 153 is a part that monitors a focus status notification from the second OS 150. To be more specific, when the second screen activation monitoring unit 153 receives a focus OFF notification from the second OS 150 which is triggered that the second application 152 has come to the front, it sends a domain switch request notification for requesting to set the second OS 150 as an active OS to the domain control unit 130.

Further, when the second screen activation monitoring unit 153 receives a domain switch ready notification from the domain control unit 130, it transmits a resource release notification notifying the completion of resource release to the second application 152. The domain switch ready notification notifies that the switching of an active operating system from the first OS 120 to the second OS 150 is possible.

Note that the second screen activation monitoring unit 153 is a process on the second OS 150, which is set so that the output from the second screen activation monitoring unit 153 is invisible on the output screen (display screen).

Figure 2:
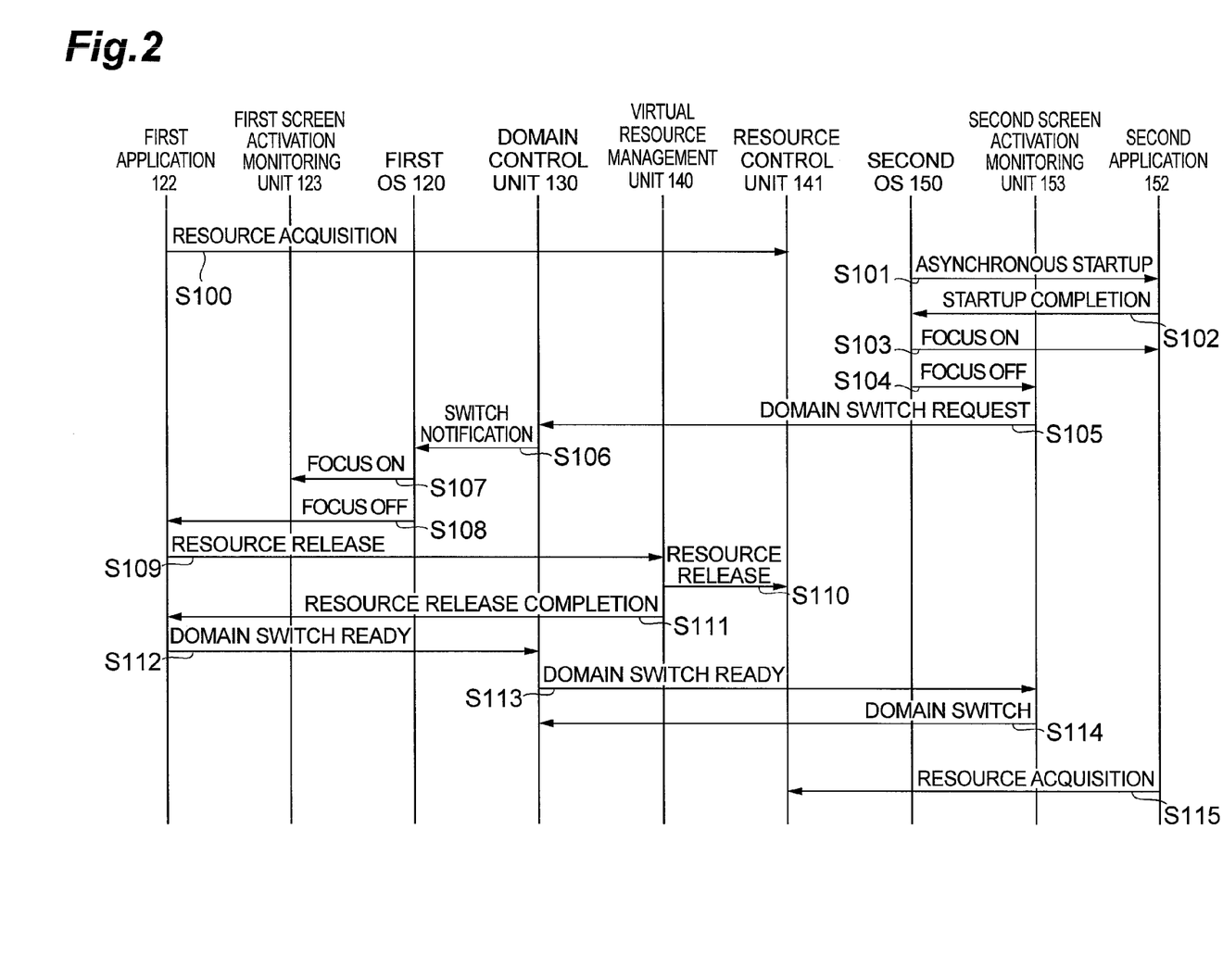
FIG. 2 is a sequence chart showing an example of a resource release process in the information processing terminal.
Figure 3:
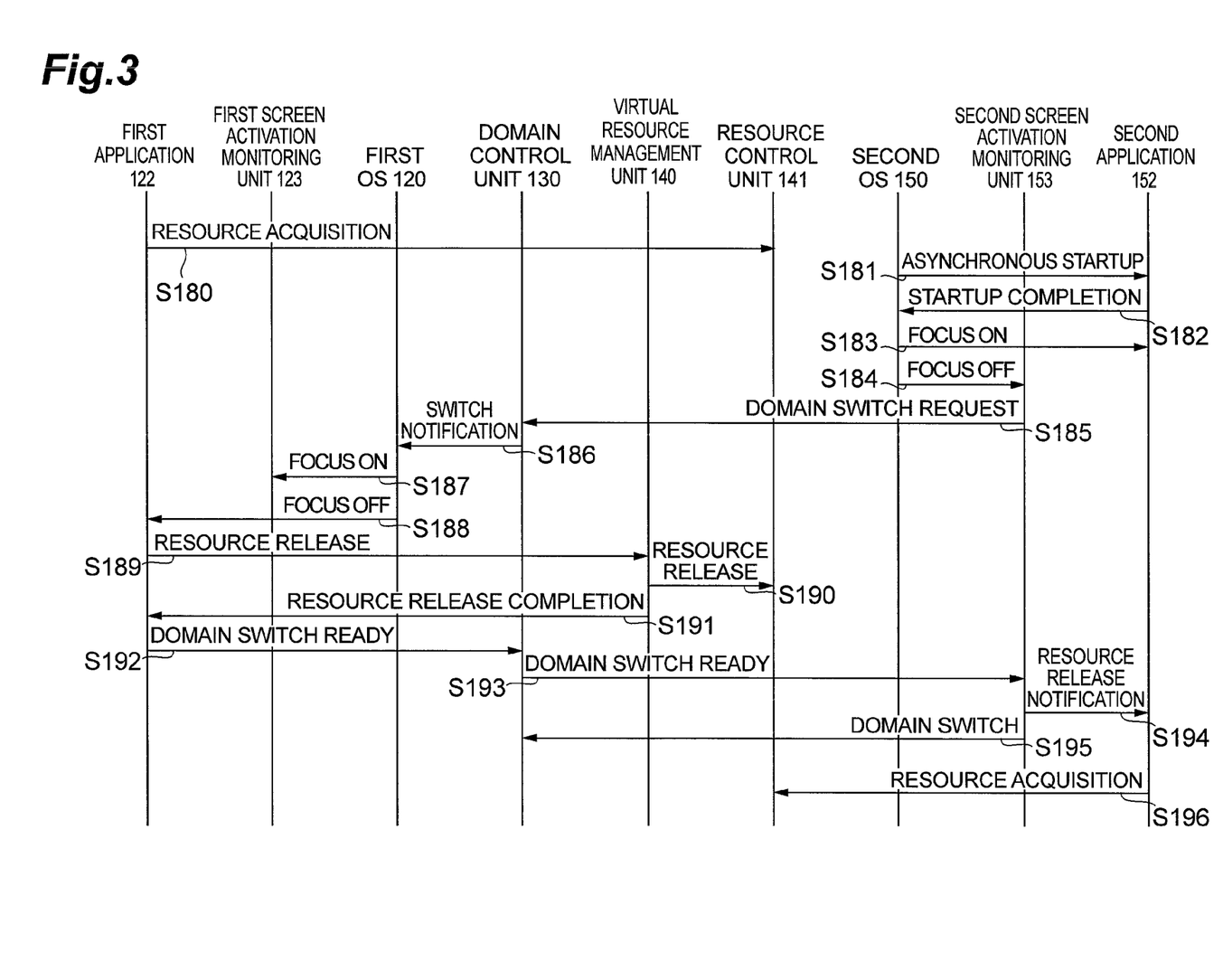
FIG. 3 is a sequence chart showing another example of a resource release process in the information processing terminal.

The operation of the information processing terminal 1A is described and further a resource release method in the information processing terminal 1A is described in detail hereinafter with reference to FIGS. 2 and 3. FIGS. 2 and 3 are sequence charts showing a resource release operation by the information processing terminal 1A. The sequence charts shown in FIGS. 2 and 3 both show the operation where a resource acquired by the first application 122 running on the first OS 120 is released, and the resource is then acquired by the second application 152 running on the second OS 150.

Referring first to FIG. 2, the first application 122 makes resource acquisition for the resource control unit 141 (S100). In this state, when an event for starting the second application 152 occurs, the second OS 150 starts the second application 152 (S101). After started, the second application 152 makes a notification indicating the start to the second OS 150 (S102). Note that Step S101 includes not only the case where the second application 152 is newly started but also the case where an active application is switched to a resident application or an already started application, triggered by an asynchronous event such as an incoming call or an internal timer. Further, Step S101 further includes the switching of an application that occurs when the OS to be used is switched by a user's manual operation.

Because the first OS 120 and the second OS 150 according to this embodiment have a function of making a focus status notification to a process, the second OS 150 sends a focus ON notification to the second application 152 (S103) and sends a focus OFF notification to the second screen activation monitoring unit 153 (S104). Specifically, the second screen activation monitoring unit 153 is a process running on the second OS 150, and a focus OFF notification is sent to a process other than the second application 152 on the second OS 150 when the second application 152 starts and comes to the front.

Receiving the focus OFF notification, the second screen activation monitoring unit 153 sends a domain switch request notification for requesting to set the second OS 150 and the second application 152 to be active to the domain control unit 130 (S105, domain switch request notification step). Receiving the domain switch request notification from the second screen activation monitoring unit 153, the domain control unit 130 sends a domain switch notification notifying that the first OS 120 is to be set as an inactive operating system to the first OS 120 (S106, domain switch notification step).

Receiving the domain switch notification, the first OS 120 sends a focus ON notification to the first screen activation monitoring unit 123 (S107, focus status notification step) and further sends a focus OFF notification to the first application 122, which has been at the front (S108, focus status notification step). Specifically, the first OS 120 according to this embodiment is implemented so as to bring the first screen activation monitoring unit 123, which is a virtual process, to the front at the time when an application located at the front is moved to the back and becomes inactive. The first screen activation monitoring unit 123 thereby enters a virtually active state. Because the first screen activation monitoring unit 123 is a hidden process, it does not appear on the output screen. Thus, the first screen activation monitoring unit 123 does not interfere with the operation and manipulation of the second application 152.

If the first application 122 according to this embodiment is implemented so as to release an acquired resource when it receives the focus OFF notification, the first application 122 notifies the release of a resource to the virtual resource management unit 140 (S109). The virtual resource management unit 140 then controls the resource control unit 141 to release a resource (S110, resource release step). The virtual resource management unit 140 then sends a resource release completion notification to the first application 122.

Receiving the resource release completion notification, the first application 122 sends a domain switch ready notification notifying that the switching of an active OS is ready to the domain control unit 130 (S112). Further, the domain control unit 130 sends a domain switch ready notification to the second screen activation monitoring unit 153 (S113). Receiving the notification, the second screen activation monitoring unit 153 directs the domain control unit 130 to switch a domain (S114).

Because the acquisition of a resource has become possible by the above process, the second application 152 carries out the acquisition of a necessary resource (S115). The acquisition of a resource is made by associating the resource with the second application 152 in the resource control unit 141, for example.

The sequence chart in FIG. 3 is described next. The processing in Steps S180 to S193 in the sequence chart of FIG. 3 is the same as the processing in Steps S100 to S113 in the sequence chart of FIG. 2.

When the second screen activation monitoring unit 153 receives a domain switch ready notification from the domain control unit 130 (S193, domain switch ready notification step), it sends a resource release notification notifying that the release of a resource has completed to the second application 152 (S194, resource release notification step). This eliminates the need for the second application 152 to make regular inquiries to a functional unit that controls hardware at the time of resource acquisition. Thus, this promotes the efficiency of the resource acquisition process. The processing in Steps S195 to S196 in the sequence chart of FIG. 3 is the same as the processing in Steps S114 to S115 in the sequence chart of FIG. 2.

According to the information processing terminal 1A and the resource release method of the first embodiment described above, the second screen activation monitoring unit 153 that has received a focus OFF notification sends a domain switch request notification to the domain control unit 130, and the domain control unit 130 that has received the notification sends a domain switch notification to the first OS 120. Then, the first OS 120 sends a focus ON notification to the first screen activation monitoring unit 123 and further sends a focus OFF notification to the first application 122. If the first application 122 is implemented to release an acquired resource when it receives the focus OFF notification, the first application 122 carries out the release of a resource. Thus, with the first and second screen activation monitoring units 123 and 153 running as a process on each operating system, the release of a resource at the switching of an operating system can be implemented easily without providing a special mechanism for resource release.

Second Embodiment

Figure 4:
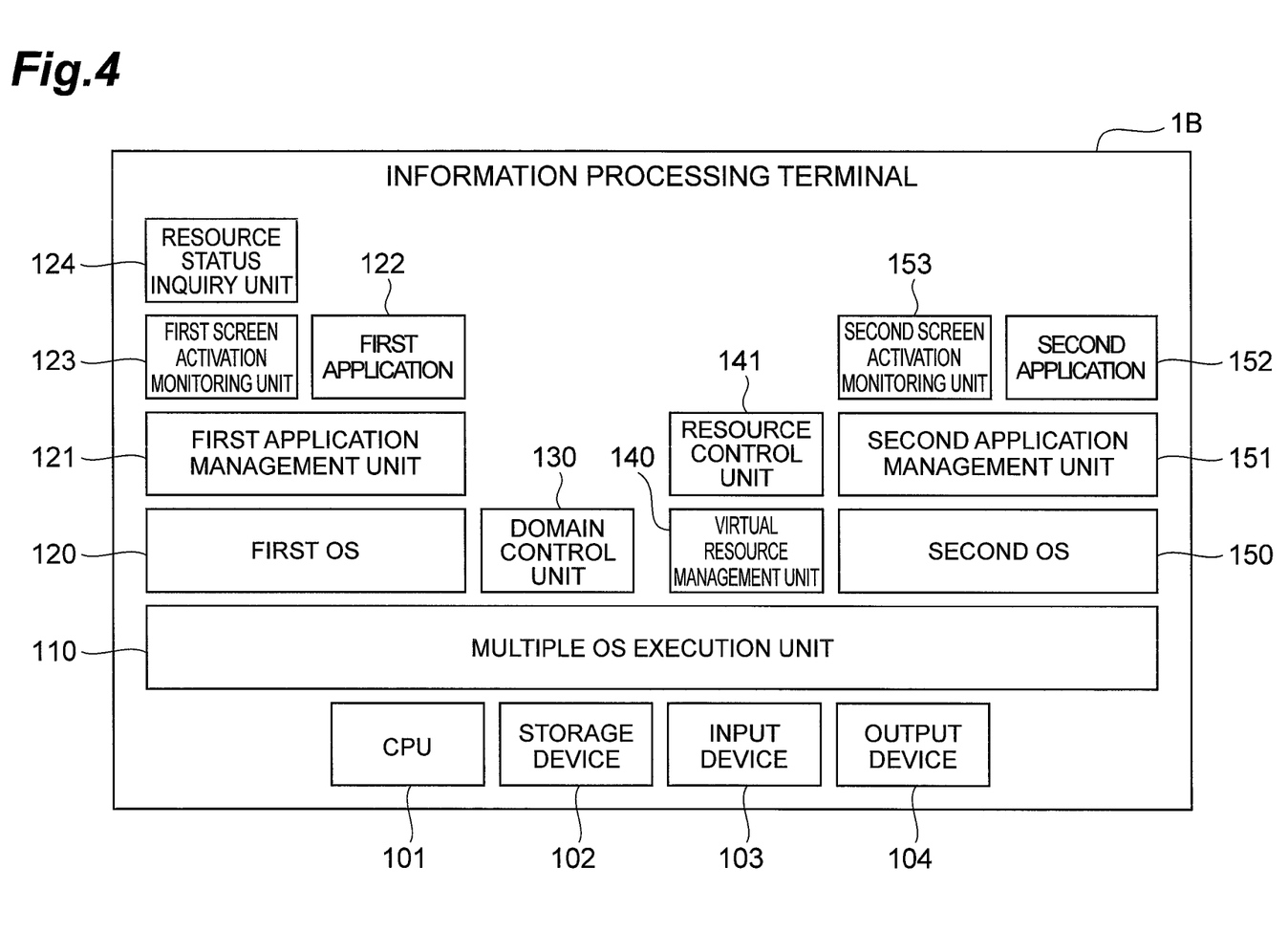
FIG. 4 is a schematic configuration diagram of an information processing terminal according to a second embodiment of the present invention.

A second embodiment of the present invention is described hereinbelow. FIG. 4 is a schematic configuration diagram of an information processing terminal 1B according to the second embodiment. The information processing terminal 1B is different from the information processing terminal 1A according to the first embodiment in that it includes a resource status inquiry unit 124 (resource status inquiry means).

The resource status inquiry unit 124 is a part that makes an inquiry about a resource release status to the virtual resource management unit 140 when it receives a resource status check request notification from the first screen activation monitoring unit 123. Further, when the resource status inquiry unit 124 receives a response that a resource is not yet released from the virtual resource management unit 140, it can control the first application 122 to suspend or terminate.

Further, when the first screen activation monitoring unit 123 according to the second embodiment receives a focus ON notification, it sends a resource status check request notification for requesting an inquiry about a resource release status to the resource status inquiry unit 124.

Figure 5:
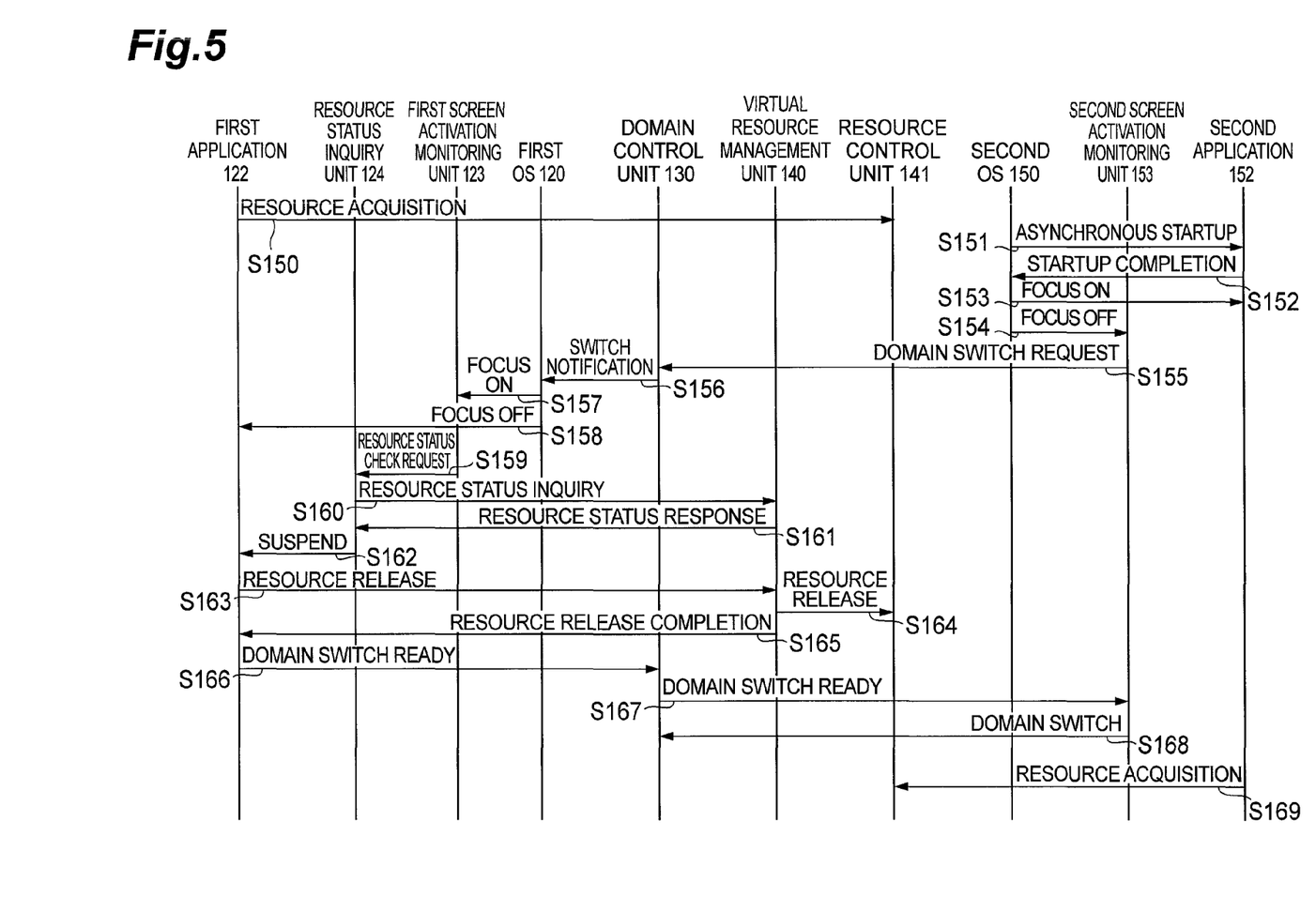
FIG. 5 is a sequence chart showing another example of a resource release process in the information processing terminal according to the second embodiment.

The operation of the information processing terminal 1B is described and further a resource release method in the information processing terminal 1B is described in detail hereinafter with reference to FIG. 5. FIG. 5 is a sequence chart showing a resource release operation by the information processing terminal 1B. The sequence chart shown in FIG. 5 shows the operation where a resource acquired by the first application 122 running on the first OS 120 is released, and the resource is then acquired by the second application 152 running on the second OS 150.

The processing in Steps S150 to S158 in the sequence chart of FIG. 5 is the same as the processing in Steps S100 to S108 in the sequence chart of FIG. 2. When the first screen activation monitoring unit 123 receives a focus ON notification (S157), it sends a resource status check request notification to the resource status inquiry unit 124 (S159, resource status check request notification step). Receiving the resource status check request notification from the first screen activation monitoring unit 123, the resource status inquiry unit 124 makes an inquiry about a resource release status to the virtual resource management unit 140 (S160, application stop step).

If the first application 122 according to the second embodiment is not implemented to release an acquired resource when it receives the focus OFF notification, a resource is still acquired by the first application 122, and therefore the resource status inquiry unit 124 receives a response that a resource is not yet released from the virtual resource management unit 140 (S161). In this case, the resource status inquiry unit 124 controls the first application 122 to suspend (S162, application stop step). Alternatively, the resource status inquiry unit 124 may control the first application 122 to terminate. When the first application 122 suspends or terminates, the release of the resource acquired by the first application 122 becomes possible (S163).

The processing in Steps S164 to S169 in the sequence chart of FIG. 5 is the same as the processing in Steps S110 to S115 in the sequence chart of FIG. 2.

According to the information processing terminal 1B and the resource release method of the second embodiment described above, even when the first application 122 is not implemented to release an acquired resource when it receives the focus OFF notification, the first screen activation monitoring unit 123 that has received the focus ON notification makes an inquiry about a resource release status and, when a resource is not yet released, the first application 122 is forced to suspend or terminate. This enables the release of a resource acquired by the first application 122 and thereby allows the second application 152 to acquire a resource.

Although embodiments of the present invention are described in detail, the present invention is not restricted to the above-described embodiments, and various changes and modifications may be made without departing from the scope of the invention.

INDUSTRIAL APPLICABILITY

The present invention enables the appropriate release of a resource acquired by an application before switching at the time of application switching that accompanies OS switching in an information processing terminal to run a plurality of OS.

REFERENCE SIGNS LIST 1A,1B . . . information processing terminal,
101 . . . CPU,
102 . . . storage device,
103 . . . input device,
104 . . . output device,
110 . . . multiple OS execution unit,
120 . . . first OS,
121 . . . first application management unit,
122 . . . first application,
123 . . . first screen activation monitoring unit,
124 . . . resource status inquiry unit,
130 . . . domain control unit,
140 . . . virtual resource management unit,
141 . . . resource control unit,
150 . . . second OS,
151 . . . second application management unit,
152 . . . second application,
153 . . . second screen activation monitoring unit

The invention claimed is:

1. An information processing terminal configured to run a plurality of operating systems having a function of sending to a process a focus status notification indicating whether an output is in front and whether the process is active, comprising:
    circuitry configured to
        control which of the plurality of operating systems is an active operating system;
        provide a first screen activation monitoring unit configured to run on a first operating system among the plurality of operating systems and receive a focus status notification from the first operating system, the first screen activation monitoring unit being configured to run as an invisible active process on a display screen when the first operating system is set as an inactive operating system;

provide a second screen activation monitoring unit configured to run on a second operating system among the plurality of operating systems and receive a focus status notification from the second operating system, the second screen activation monitoring unit being configured to run as an invisible active process on a display screen when the second operating system is set as an inactive operating system; and manage a resource used by each of the operating systems, wherein when receiving a focus OFF notification, being the focus status notification from the second operating system, indicating that an output is moved to back and no longer active, a second application running on the second operating system has received a focus ON notification and come to front, the second screen activation monitoring unit sends a domain switch request notification for requesting to set the second operating system as an active operating system to the circuitry, when receiving the domain switch request notification from the second screen activation monitoring unit, the circuitry sends a domain switch notification notifying that the first operating system is to be set as an inactive operating system to the first operating system, when receiving the domain switch notification, the first operating system sends a focus ON notification, being the focus status notification, indicating that an output has come to front and become active to the first screen activation monitoring unit and further sends the focus OFF notification to a first application running on the first operating system, when receiving a resource release notification notifying release of a resource from the first application, triggered by receipt of the focus OFF notification, the circuitry releases a resource acquired by the first application when the first screen activation monitoring unit running on the first operating system is in a focus ON state, the first application running on the first operating system is in a focus OFF state, and the second application running on the second operating system is in a focus ON state, and when the second screen activation monitoring unit running on the second operating system is in a focus ON state, the second application running on the second operating system is in a focus OFF state, and the first application running on the first operating system is in a focus ON state.

2. The information processing terminal according to claim 1, wherein when receiving the focus ON notification, the first screen activation monitoring unit sends a resource status check request notification for requesting an inquiry about a resource release status to the circuitry, when receiving the resource status check request notification, the circuitry, when a resource is not yet released, causes the first application to suspend or terminate, and when receiving the resource release notification from the first application, triggered that the first application has suspended or terminated, the circuitry makes control to release a resource acquired by the first application.

3. The information processing terminal according to claim 1, wherein when receiving a notification from the first application, triggered by completion of release of a resource acquired by the first application, the circuitry sends a domain switch ready notification notifying that switching of an active operating system from the first operating system to the second operating system is possible to the second screen activation monitoring unit, and when receiving the domain switch ready notification, the second screen activation monitoring unit sends a resource release notification notifying completion of release of a resource to the second application.

4. A resource release method, implemented by an information processing terminal configured to run a plurality of operating systems having a function of sending to a process a focus status notification indicating whether an output is in front and whether the process is active, the method comprising:

controlling, by circuitry of the information processing terminal, which of the plurality of operating systems is an active operating system;

providing, by the circuitry, a first screen activation monitoring unit configured to run on a first operating system among the plurality of operating systems and receive a focus status notification from the first operating system, the first screen activation monitoring unit running as an invisible active process on a display screen when the first operating system is set as an inactive operating system;

providing, by the circuitry, a second screen activation monitoring unit configured to run on a second operating system among the plurality of operating systems and receive a focus status notification from the second operating system, the second screen activation monitoring unit running as an invisible active process on the display screen when the second operating system is set as an inactive operating system; and managing, by the circuitry, a resource used by each of the operating systems, wherein when receiving a focus OFF notification, being the focus status notification from the second operating system, indicating that an output is moved to back and no longer active, a second application running on the second operating system has received a focus ON notification and come to front, the second screen activation monitoring unit sends a domain switch request notification for requesting to set the second operating system as an active operating system to the circuitry, when receiving the domain switch request notification from the second screen activation monitoring unit, the circuitry sends a domain switch notification notifying that the first operating system is to be set as an inactive operating system to the first operating system, when receiving the domain switch notification, the first operating system sends a focus ON notification, being the focus status notification, indicating that an output has come to front and become active to the first screen activation monitoring unit and further sends the focus OFF notification to a first application running on the first operating system, when receiving a resource release notification notifying release of a resource from the first application, triggered by receipt of the focus OFF notification, the circuitry releases a resource acquired by the first application, when the first screen activation monitoring unit running on the first operating system is in a focus ON state, the first application running on the first operating system is in a focus OFF state, and the second application running on the second operating system is in a focus ON state, and when the second screen activation monitoring unit running on the second operating system is in a focus ON state, the second application running on the second operating system is in a focus OFF state, and the first application running on the first operating system is in a focus ON state.

5. The resource release method according to claim 4, the method further comprising:
   when receiving the focus ON notification, sending a resource status check request notification for requesting an inquiry about a resource release status to the circuitry by the first screen activation monitoring unit; and
   when receiving the resource status check request notification and when a resource is not yet released, causing the first application to suspend or terminate by the circuitry, wherein
   when receiving the resource release notification from the first application, triggered that the first application has suspended or terminated, releasing a resource acquired by the first application.

6. The resource release method according to claim 4, further comprising:
   when receiving a notification from the first application, triggered by completion of release of a resource acquired by the first application, sending a domain switch ready notification notifying that switching of an active operating system from the first operating system to the second operating system is possible to the second screen activation monitoring unit by the circuitry; and
   when receiving the domain switch ready notification, sending a resource release notification notifying completion of release of a resource to the second application by the second screen activation monitoring unit.

* * * * *